United States Patent
Shibao

(10) Patent No.: US 10,149,245 B2
(45) Date of Patent: Dec. 4, 2018

(54) INFORMATION PROCESSING APPARATUS, METHOD OF CONTROLLING THE SAME AND STORAGE MEDIUM

(71) Applicant: CANON KABUSHIKI KAISHA, Tokyo (JP)

(72) Inventor: Koki Shibao, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 68 days.

(21) Appl. No.: 14/564,715

(22) Filed: Dec. 9, 2014

(65) Prior Publication Data
US 2015/0189595 A1  Jul. 2, 2015

(30) Foreign Application Priority Data

Dec. 27, 2013  (JP) .................... 2013-273165

(51) Int. Cl.
*H04W 52/02*  (2009.01)
*H04W 84/12*  (2009.01)

(52) U.S. Cl.
CPC ... *H04W 52/0229* (2013.01); *H04W 52/0216* (2013.01); *H04W 52/0254* (2013.01); *H04W 84/12* (2013.01); *Y02D 70/00* (2018.01); *Y02D 70/142* (2018.01)

(58) Field of Classification Search
None
See application file for complete search history.

(56) References Cited

U.S. PATENT DOCUMENTS

| | | | | |
|---|---|---|---|---|
| 6,275,932 B1* | 8/2001 | Yamaguchi | ........... | G06F 1/1616 713/2 |
| 7,047,430 B2* | 5/2006 | Chang | ................. | G06F 1/3203 713/324 |
| 7,274,929 B1* | 9/2007 | Banginwar | ....... | H04W 52/0258 455/418 |
| 7,417,971 B2* | 8/2008 | Jeong | ................ | H04W 52/0216 370/331 |
| 8,127,162 B2* | 2/2012 | Satoh | .................... | G06F 1/3209 713/322 |
| 8,464,082 B2 | 6/2013 | Shibao | | |

(Continued)

FOREIGN PATENT DOCUMENTS

JP  2002-300175 A  10/2002

*Primary Examiner* — Christopher M Crutchfield
*Assistant Examiner* — Thinh D Tran
(74) *Attorney, Agent, or Firm* — Fitzpatrick, Cella, Harper & Scinto

(57) ABSTRACT

An information processing apparatus includes a wireless LAN control unit which performs a wireless communication, a power mode setting unit which accepts a setting instruction for setting a power saving mode to be OFF or ON from a user, and a power saving mode setting storage unit which holds a setting that is set for the power saving mode, and a table storing a setting for turning the power saving mode off/on in association with a protocol used in a wireless communication. In case the power mode setting unit holds the setting for setting the power saving mode to be ON, the information processing apparatus controls whether or not to turn on the power saving mode based on a protocol used in the wireless communication and a setting of the power saving mode stored in the table in association with that protocol.

8 Claims, 9 Drawing Sheets

(56) References Cited

U.S. PATENT DOCUMENTS

| | | | |
|---|---|---|---|
| 8,804,156 B2* | 8/2014 | Park | G06F 21/6218 |
| | | | 358/1.14 |
| 8,838,790 B2 | 9/2014 | Shibao | |
| 8,840,208 B2* | 9/2014 | Hirose | B41J 29/38 |
| | | | 347/9 |
| 9,107,164 B1* | 8/2015 | Troyanker | H04W 52/0229 |
| 9,565,690 B2* | 2/2017 | Kim | H04W 72/10 |
| 2005/0012776 A1* | 1/2005 | Kato | B41J 2/165 |
| | | | 347/23 |
| 2008/0018930 A1* | 1/2008 | Koike | G03G 15/5004 |
| | | | 358/1.15 |
| 2009/0021764 A1* | 1/2009 | Kano | G06F 21/608 |
| | | | 358/1.14 |
| 2009/0259868 A1* | 10/2009 | Katoh | G03G 15/5004 |
| | | | 713/324 |
| 2010/0202018 A1* | 8/2010 | Akiyama | G03G 15/5004 |
| | | | 358/1.15 |
| 2010/0231966 A1* | 9/2010 | Todaka | G06F 1/3203 |
| | | | 358/1.15 |
| 2013/0031395 A1* | 1/2013 | Yamada | H04L 12/12 |
| | | | 713/323 |

* cited by examiner

FIG. 6

ENABLE POWER SAVE MODE?

YES　　NO

F I G. 9

| PROTOCOL TYPE | POWER SAVING MODE DEFINITION |
|---|---|
| DNS | ON |
| HTTP | ON |
| NFS | OFF |
| DHCP | ON |
| SNMP | OFF |
| SMTP | OFF |
| POP | OFF |
| SMB | OFF |
| FTP | OFF |

INFORMATION PROCESSING APPARATUS, METHOD OF CONTROLLING THE SAME AND STORAGE MEDIUM

BACKGROUND OF THE INVENTION

Field of the Invention

The present invention relates to an information processing apparatus, a method of controlling the same, and a storage medium.

Description of the Related Art

In recent years, many electronic devices equipped with a wireless LAN terminal in compliance with an IEEE 802.11 standard have been commercialized, and one of these is an image forming apparatus. Similarly to conventional wireless LAN terminals, a wireless communication unit of the image forming apparatus connectable to a wireless LAN has a power saving mode for reducing an amount of power consumption. In general, when the wireless LAN terminal enters the power saving mode, a state in which data can be received continuously from an access point is exited (for example, refer to Japanese Patent Laid-Open No. 2002-300175). Specifically, as shown in FIG. 1, data can be received at an arbitrary timing from the access point in a case where the power saving mode is not being executed on the wireless LAN terminal.

FIG. 1 is a view for explaining operation of an access point and a wireless LAN terminal when the power saving mode is disabled. In this state, the access point is able to transmit data to the wireless LAN terminal at any timing when a request for data transmission occurs.

However, in the power saving mode, reception is performed upon a trigger of information notified of from an access point, called a TIM (Traffic Indication Message) or a DTIM (Delivery Traffic Indication Message) (201 of FIG. 2).

FIG. 2 is a view for explaining operation of the access point and the wireless LAN terminal in a case where the power saving mode is enabled.

The TIM is information included in a beacon that the access point transmits periodically to the wireless LAN terminal, and the TIM notifies the wireless LAN terminal that there is data to be transmitted to the wireless LAN terminal. The DTIM is a type of TIM that notifies that the transmission data is multi-cast or broadcast data. Note that the DTIM can be set such that it is only transmitted once for a plurality of TIMs (the DTIM is normally transmitted once for one TIM, i.e., a TIM interval=a DTIM interval).

In this way, in a case where the wireless LAN terminal is in the power saving mode, a state is entered in which transmission from the access point to the wireless LAN terminal can only be initiated at constant intervals. Because the notification of the TIM or the DTIM is dependent upon a transmission period of the beacon, there is a possibility that a data transmission delay will occur based on at least the interval of the beacon and the DTIM interval.

Explaining in further detail, the wireless LAN terminal has an awake state in which communication is possible, and a doze state in which power consumption is suppressed. When reception of data is performed, the access point notifies that there is data to be received using a TIM notification as a trigger. In such a case, reception is initiated only after the wireless LAN terminal notifies the access point that it changed from the doze state to the awake state in which communication is possible (202, 203*a*, 203*b* of FIG. 2). Also, a shift from the awake state to the doze state is performed in a case where transmission and reception of a packet does not occur in a predetermined interval in the awake state (204 of FIG. 2). Similarly to a case where the wireless LAN terminal shifts to the awake state, it notifies the access point that it changes into the doze state (205 of FIG. 2).

In the power saving mode, there are cases in which shifts between the awake state and the doze state occur frequently in the process of communication of the same session. In a case where large capacity data is received intermittently, whether or not a subsequent packet can be received within a predetermined amount of time is dependent upon capabilities and operation applications of the communication partner device of the wireless LAN terminal and a setting of a time interval for the wireless LAN terminal shifting into the doze state (normally this is a fixed value in the terminal). For these reasons, after the wireless LAN terminal initiates reception of data, it cannot be guaranteed that the wireless LAN terminal will not shift to the doze state in the process of communication of the session.

FIG. 3 is a view for explaining an operation in a case where the power saving mode is enabled when a large capacity of data is transmitted to the wireless LAN terminal from the access point.

If a subsequent packet cannot be received within a predetermined amount of time after receiving a packet, the wireless LAN terminal shifts to the doze state from the awake state (301 of FIG. 3). When the subsequent packet is received in the doze state, once again the awake state is shifted into (302 of FIG. 3). In this way, when shifting between the awake state and the doze state occurs frequently in the process of communication of the same session, a communication delay occurs due to overhead of the change in state. Also, when the amount of data communicated becomes large, delays in communication occur markedly.

SUMMARY OF THE INVENTION

The present invention, in order to solve the problems of the above described techniques, provides a technique that makes turning a power saving mode OFF/ON in wireless communication more flexible, and achieves both prevention of communication delay and reduction of an amount of power consumed by wireless communication.

According to one aspect of the present invention, there is provided an information processing apparatus, comprising: a wireless communication unit configured to perform a wireless communication; a setting unit configured to accept, from a user, a setting instruction for setting a power saving mode to be OFF or ON; a holding unit configured to hold a setting for the power saving mode which is set by the setting instruction; a storage unit configured to store a setting for turning the power saving mode off or on in association with a protocol used in a wireless communication; and a control unit configured to control, in a case where the holding unit holds the setting for setting the power saving mode to be ON, whether or not to turn on the power saving mode based on a protocol used in the wireless communication by the wireless communication unit and a setting of the power saving mode stored in the storage unit in association with that protocol.

According to another aspect of the present invention, there is provided a control method for controlling an information processing apparatus, the method comprising: performing a wireless communication; accepting, from a user, a setting instruction for setting a power saving mode to be OFF or ON; holding a setting for the power saving mode which is set by the setting instruction; storing, in a storage unit, a setting for turning the power saving mode off or on in association with a protocol used in a wireless communication; and controlling, in a case where the setting for setting the power saving mode to be ON is held, whether or not to turn on the power saving mode based on a protocol used in the wireless communication and a setting of the power saving mode stored in the storage unit in association with that protocol.

According to still another aspect of the present invention, there is provided a non-transitory computer-readable storage medium storing a computer program for causing a computer to execute steps of a control method for controlling an information processing apparatus, the method comprising: performing a wireless communication; accepting, from a user, a setting instruction for setting a power saving mode to be OFF or ON; holding a setting for the power saving mode which is set by the setting instruction; storing, in a storage unit, a setting for turning the power saving mode off or on in association with a protocol used in a wireless communication; and controlling, in a case where the setting for setting the power saving mode to be ON is held, whether or not to turn on the power saving mode based on a protocol used in the wireless communication and a setting of the power saving mode stored in the storage unit in association with that protocol.

By virtue of the present invention, turning a power saving mode OFF/ON in wireless communication can be made more flexible, and both prevention of communication delay and reduction of an amount of power consumed by wireless communication can be achieved.

Further features of the present invention will become apparent from the following description of exemplary embodiments (with reference to the attached drawings).

BRIEF DESCRIPTION OF THE DRAWINGS

FIG. 6 is a view for illustrating an example of a screen for accepting a setting instruction for turning OFF/ON the power saving mode from a user in the MFP according to embodiments.

FIG. 9 is a view for illustrating an example of a data configuration of a table according to embodiments.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention. The information processing apparatus according to embodiments is explained with the example of a multi-function peripheral (MFP), but the present invention is not limited to this.

Figure 1:
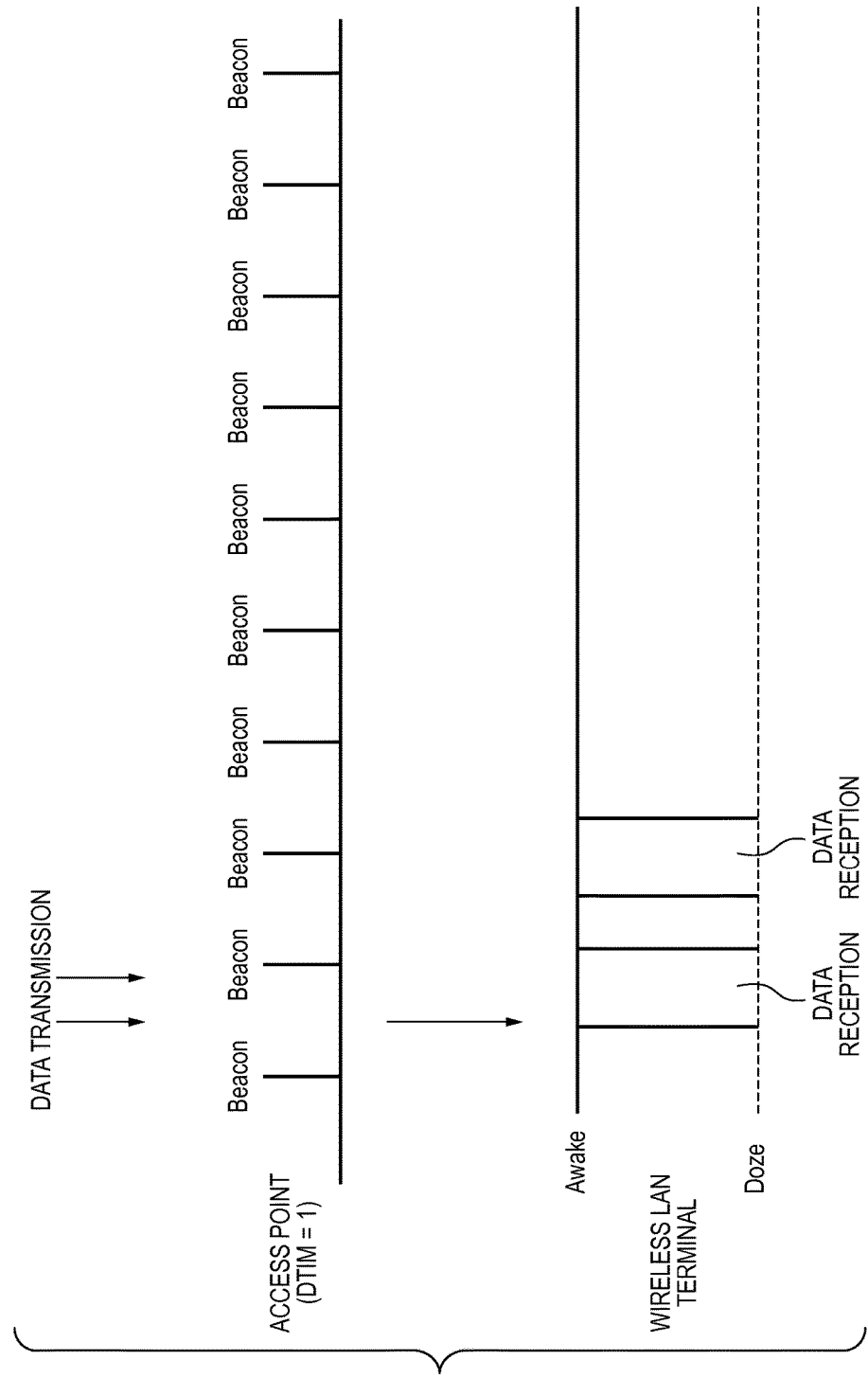
FIG. 1 is a view for explaining operation of an access point and a wireless LAN terminal when a power saving mode is disabled.
Figure 2:
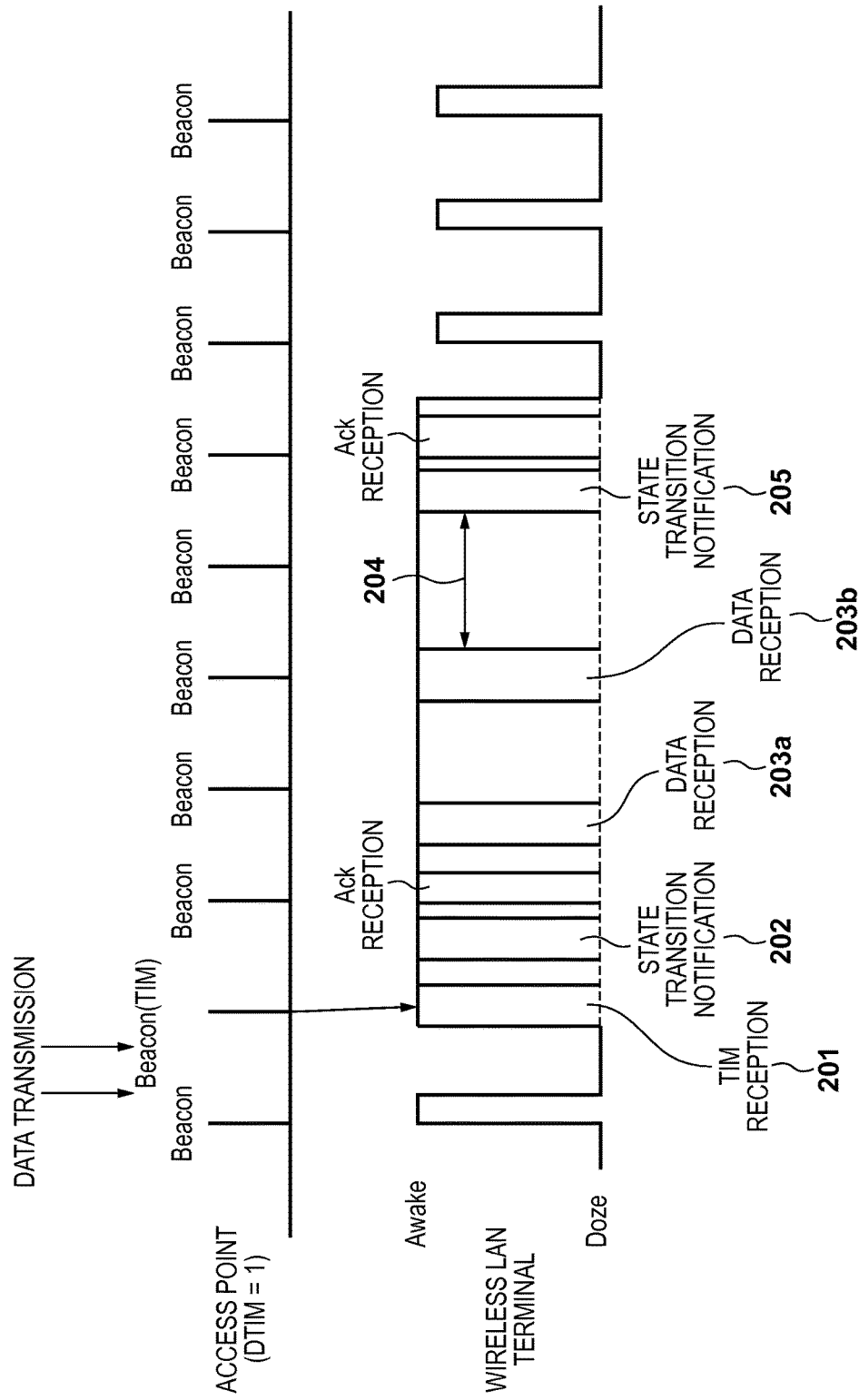
FIG. 2 is a view for explaining operation of the access point and the wireless LAN terminal in a case where the power saving mode is enabled.
Figure 3:
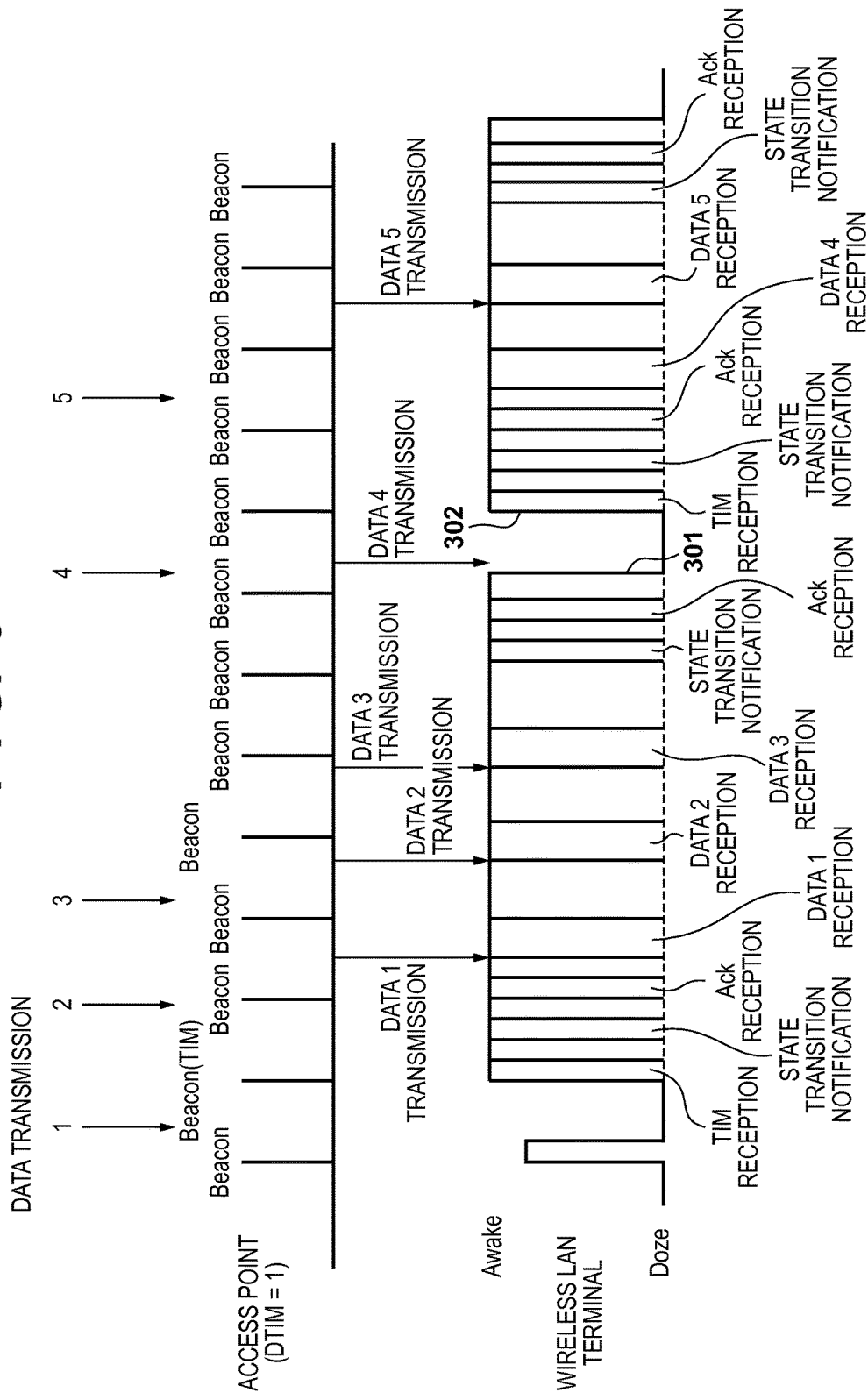
FIG. 3 is a view for explaining an operation in a case where the power saving mode is enabled when a large capacity of data is transmitted to the wireless LAN terminal from the access point.
Figure 4:
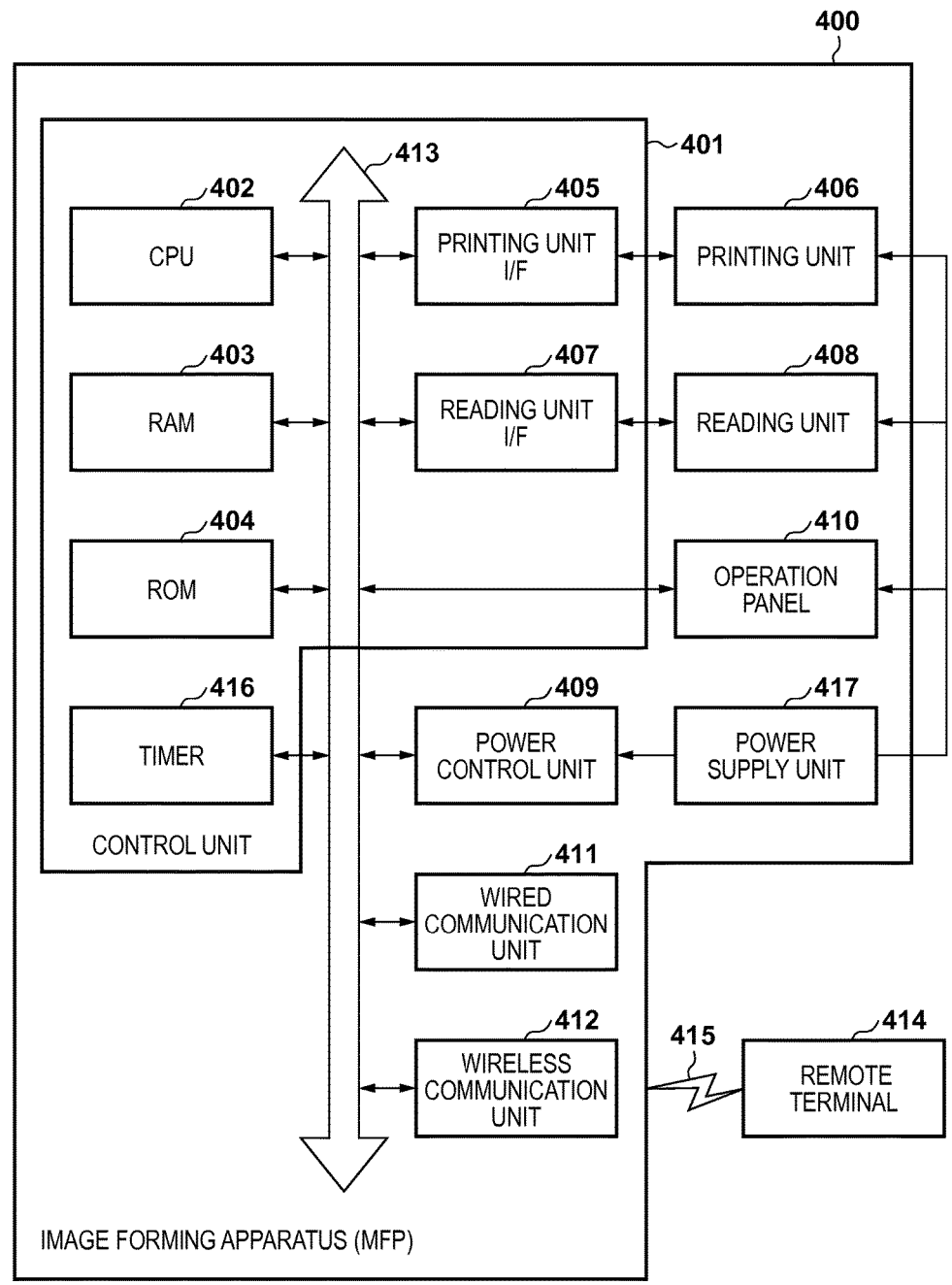
FIG. 4 is a block diagram for showing an example of a hardware configuration of an MFP according to embodiments.

FIG. 4 is a block diagram for showing an example of a hardware configuration of an MFP 400 according to embodiments of the present invention.

The MFP 400 comprises a control unit 401, a printing unit 406, a reading unit 408, a power control unit 409, an operation panel 410, a wired communication unit 411, a wireless communication unit 412, and a power supply unit 417.

The control unit 401 includes a CPU 402, a RAM 403, a ROM 404, a printing unit I/F 405, a reading unit I/F 407, and a timer 416, and these are connected to each other via a system bus 413. The CPU 402, in accordance with control programs stored in the ROM 404, performs overall control of operation of the apparatus on the whole. These control programs are stored in a program region (not shown) of the ROM 404, and are decompressed and loaded into the RAM 403 upon execution, and executed by the CPU 402. Also, these control programs may be stored in a hard disk drive or a memory card in a compressed state or in a non-compressed state, loaded into the RAM 403, and executed.

The wired communication unit 411 performs communication with a remote terminal 414 via a wired LAN (not shown). The wireless communication unit 412 performs communication with the remote terminal 414 via a wireless LAN 415. The printing unit I/F 405 is responsible for an interface for outputting image data to the printing unit 406 (printer engine). Also, the reading unit I/F 407 is responsible for an interface for inputting image data from the reading unit 408 (scanner engine). The CPU 402 processes image data inputted from the reading unit 408 via the reading unit I/F 407, and also causes the printing unit 406 to perform printing of prints image data for printing by outputting the image data to the printing unit 406 via the printing unit I/F 405.

The power control unit 409 receives a supply of power from the power supply unit 417, and controls power supply to various units of the control unit 401. The power supply unit 417 supplies power to the printing unit 406, the reading unit 408, the operation panel 410, and the power control unit 409. In a case where the operation mode of the MFP 400 is a normal mode, power is supplied to the units of the MFP 400 from the power supply unit 417, but in a case where the operation mode is a sleep mode, power is supplied only to the RAM 403, the wired communication unit 411, the wireless communication unit 412, and a portion of the operation panel 410. In addition, the MFP 400 is equipped with a power saving mode, and during the power saving mode, power from the power supply unit 417 is supplied to all portions except for the portion of the operation panel 410 of the MFP 400.

Note that the MFP 400 returns from the sleep mode in a case where a user inputs data by operating the operation panel 410, and a case where a job for the MFP 400 is received via the wired communication unit 411 or the wireless communication unit 412.

Figure 5:
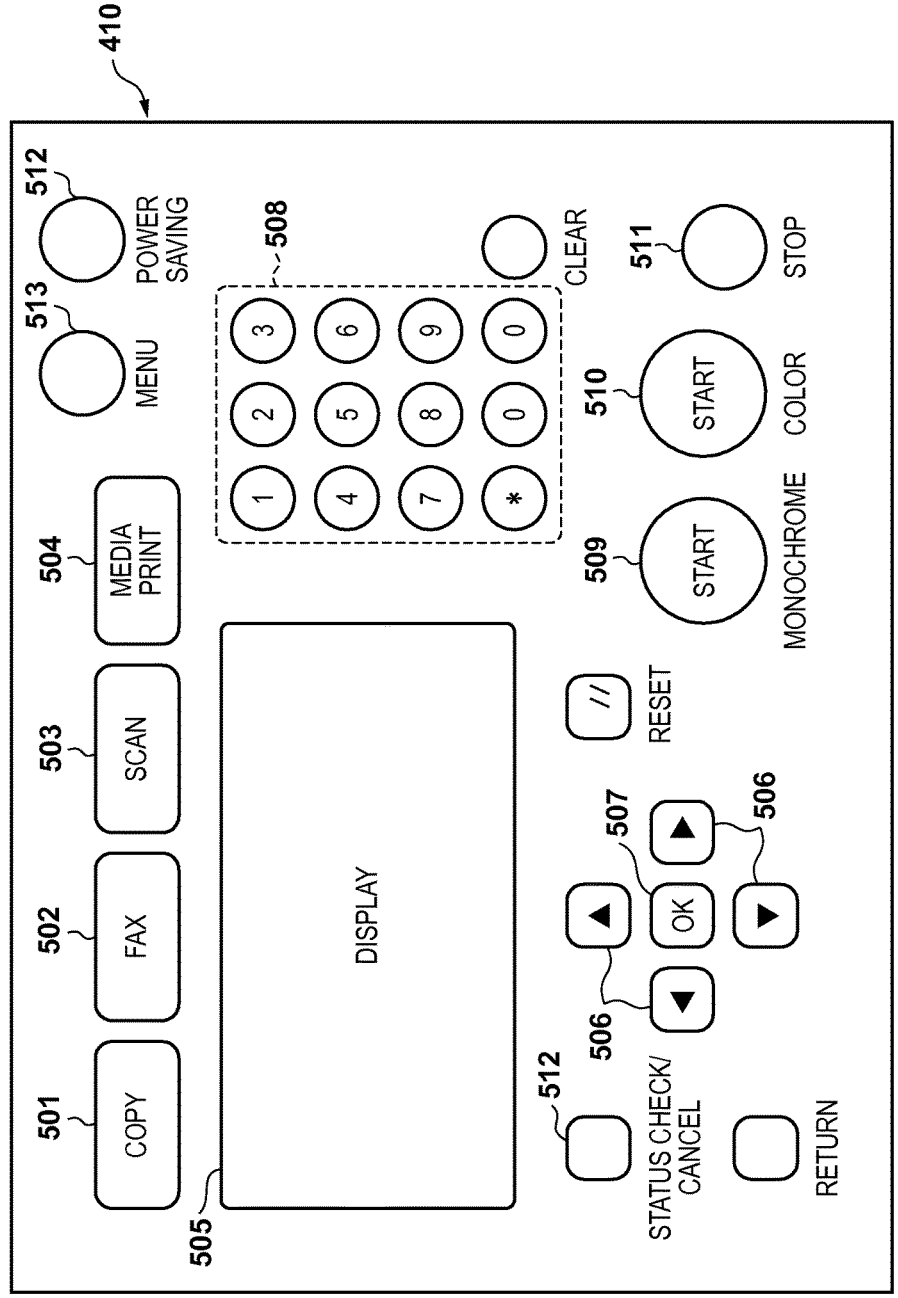
FIG. 5 is a top view of an operation panel of the MFP according to embodiments.

FIG. 5 is a top view of the operation panel 410 of the MFP 400 according to embodiments.

In the operation panel 410, there are function keys 501-504 for selecting functions such as copy, scan, or the like, and a user instructs the execution of a function by pressing a button of the function that the user wishes to use. A display unit 505 displays a setting status of each kind of function, a device status of the MFP 400, a message to the user, or the like. The display unit 505 has a touch panel function. Arrow keys 506 are employed for moving a cursor displayed on the display unit 505, and the arrow keys 506 comprise 4 buttons for instructing movement in up, down, left and right directions. In a center of the arrow keys an OK key 507 is arranged, and the OK key 507 has a function as "a deciding key" in relation to settings, queries, or the like. For example, in a case where it is desired that a copy setting (sheet size) be changed, the user causes a copy function screen to be displayed by pressing a copy function button 501. Then, when the OK key 507 is pressed in a state in which the item (the sheet size) that the user wishes to change is selected by using the arrow keys 506 on the screen, a shift is made to a setting screen for that item. Then, the user can confirm the setting of the sheet size, for example, by moving the cursor to a position of a desired setting with the arrow keys 506 and pressing the OK key 507 on the setting screen. When the user presses a power saving button 512, the MFP 400 transitions into the power saving mode. In addition, the user is able to set a power saving mode of the wireless communication unit 412 to be enabled/disabled by using a menu key 513 (refer to FIG. 6).

A numeric keypad 508 is used to input numeric values. A start key 509 is a key for instructing an initiation of a copy or a reading of an original in monochrome, and a start key 510 is a key for instructing an initiation of a copy or reading of an original in color. A stop key 511 is a key for stopping an operation such as a copy. When a status check/cancel key 512 is pressed, a status of the MFP 410 at that point in time is displayed on the display unit 505.

Figure 6:
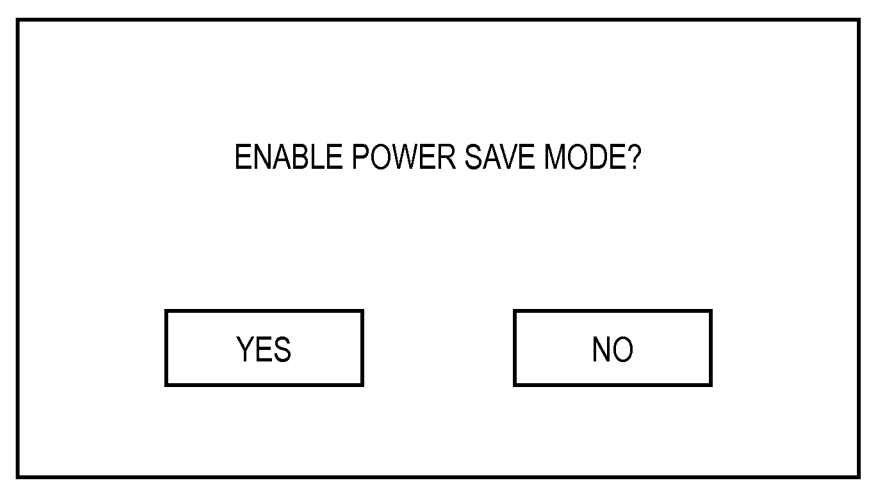

FIG. 6 is a view for illustrating an example of a screen for accepting a setting instruction for turning OFF/ON the power saving mode from a user in the MFP 400 according to embodiments.

This screen is displayed on the display unit 505 by the user pressing the menu key 513 in FIG. 5, for example. Here, when the user wishes to enable the power saving mode of the wireless communication unit 412, the user presses the "YES" button, and when the user wishes to disable the power saving mode, the user presses the "NO" button.

Figure 7:
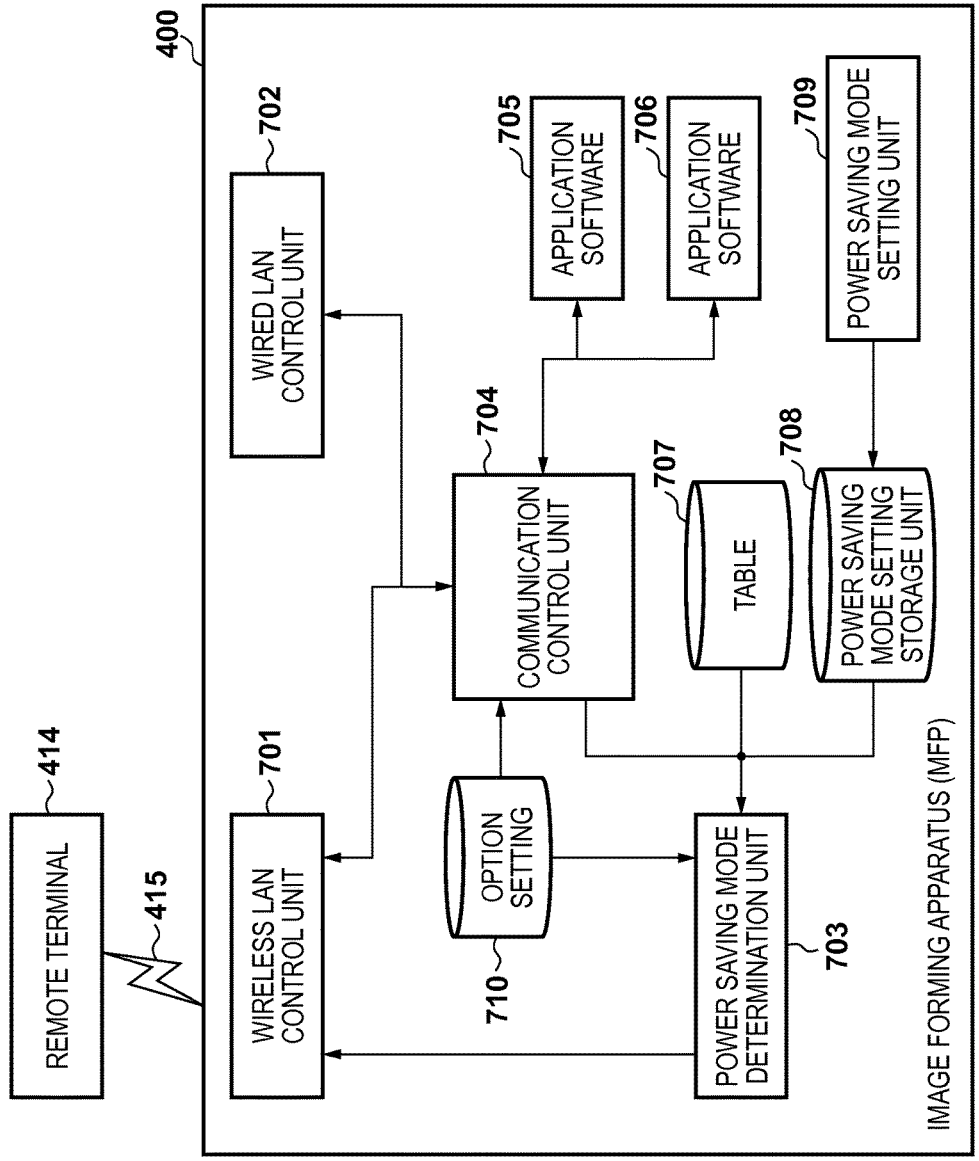
FIG. 7 is a view for illustrating an example of a software configuration of the MFP according to embodiments.

FIG. 7 is a view for illustrating an example of a software configuration of the MFP 400 according to embodiments. Functions of functional blocks of the software shown in FIG. 7 are realized by the CPU 402 executing the previously described control programs.

A wireless LAN control unit 701 controls wireless communication by the wireless communication unit 412. A wired LAN control unit 702 controls communication by the wired communication unit 411. A power saving mode setting unit 709 accepts a setting instruction for turning OFF/ON the power saving mode from the user via the screen of FIG. 6, and sets the power saving mode or cancels the setting of the power saving mode. A power saving mode setting storage unit 708 holds a setting, of whether the power saving mode is OFF/ON, which the power saving mode setting unit 709 has set. A table 707, in which an association between a protocol and a power saving mode is registered, holds a setting of whether the power saving mode of the wireless LAN terminal is OFF/ON in relation to a predetermined protocol.

An option setting 710 stores a security option set for each kind of protocol. A communication control unit 704 supports a plurality of protocols in network communication, and detects which protocols are being used to perform communication currently, and also changes communication control in accordance with an option setting 710 corresponding to the protocol. Application software 705 and 706, using the communication control unit 704, perform communication by one or multiple protocols. A power saving mode determination unit 703 determines which power mode should be executed, by referencing the setting of the power saving mode stored in the power saving mode setting storage unit 708, the table 707, protocols detected by the communication control unit 704, and the option setting 710.

Figure 8:
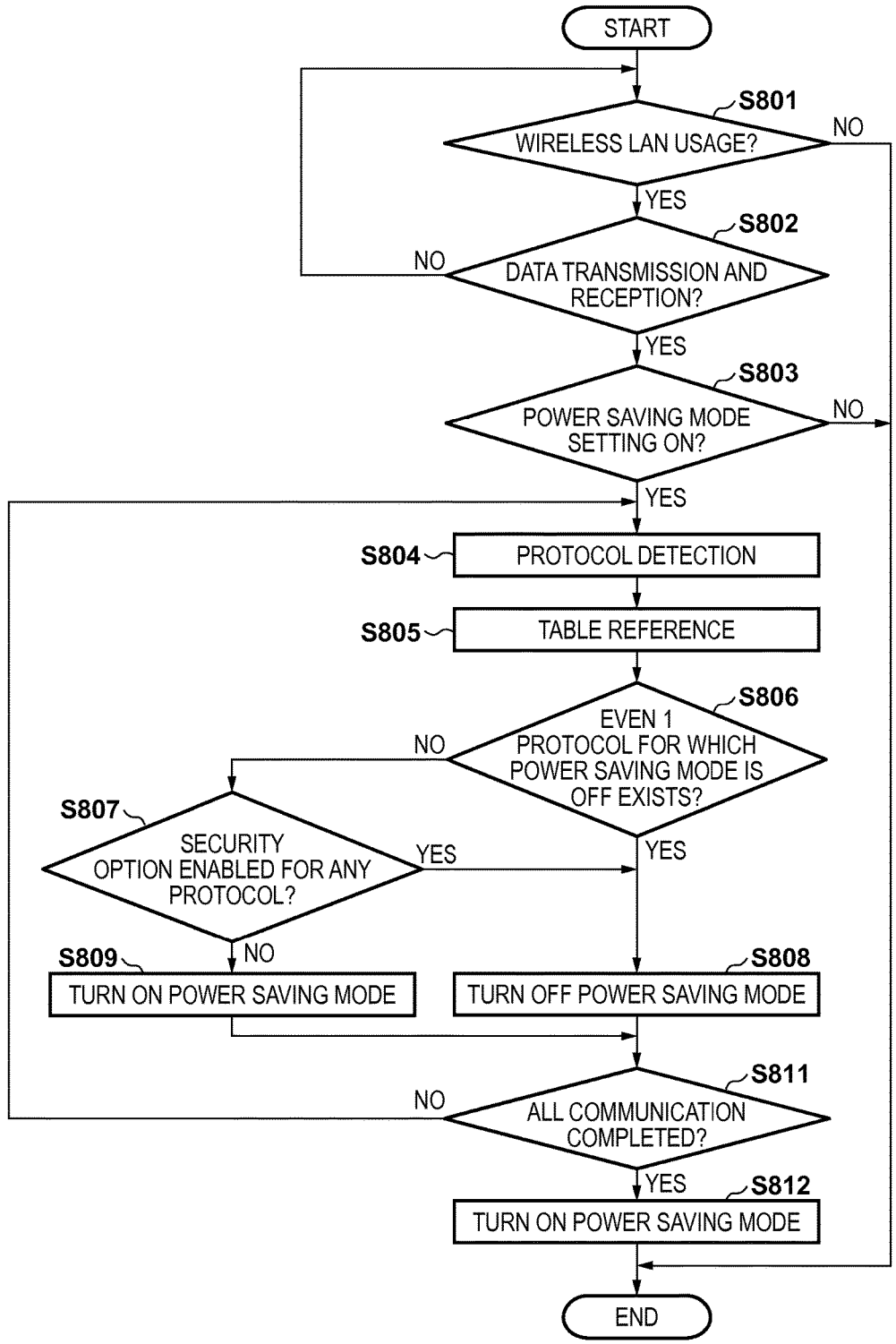
FIG. 8 is a flowchart for explaining processing for determining whether or not to transition to the power saving mode in a case where the MFP according to embodiments is performing communication by the wireless LAN.

FIG. 8 is a flowchart for explaining processing for determining whether or not to transition to the power saving mode in a case where the MFP 400 according to embodiments is performing communication by the wireless LAN. Note that, this processing is achieved by the CPU 402 executing a program stored in the ROM 404. Here, explanation will be given with reference to the software of FIG. 7.

Firstly, in step S801, the CPU 402 determines whether or not the communication by the wireless LAN has been enabled by the wireless LAN control unit 701. Here, when the communication by the wireless LAN is not enabled, the processing completes as is, and if the communication by the wireless LAN is enabled, the processing proceeds to step S802. This is because a power save in the wireless communication is focused on.

In step S802, the CPU 402 determines whether or not data transmission and reception is being performed under the control of the communication control unit 704. When data transmission and reception is not being executed, the processing returns to step S801, and when data transmission and reception is being executed, the processing proceeds to step S803. In step S803, the CPU 402 checks a setting value stored in the power saving mode setting storage unit 708. Here, when the power saving mode is set to OFF, the process is terminated as is. This is because, for example, it is not necessary to perform power save control because it is a case in which the user set the power saving mode to be constantly OFF by the user's own will.

Meanwhile, when the power saving mode is set to ON in step S803, the processing proceeds to step S804. In step S804, the CPU 402, by the communication control unit 704, detects protocols that are currently being used in the wireless communication. As a result, one or more protocol is detected. Next, the processing proceeds to step S805, and the CPU 402, by referencing the table 707, obtains associations of the power saving mode with the detected protocols.

FIG. 9 is a view for illustrating an example of a data configuration of the table 707 according to embodiments.

In FIG. 9, it is defined whether the power saving mode is ON/OFF in association with the types of the protocols. The following example can be considered as a basis for general definitions, but it goes without saying that the definitions may be changed in accordance with the application example.

For a protocol for which there is a possibility that traffic will become large, a communication delay is prevented by turning off the power saving mode.

For a protocol for which a certain amount of delay is permitted by performing a retry or the like, the power saving mode is turned on.

In this embodiment, NFS, SMB, and FTP protocols are defined to be protocols of the former type. This is because the NFS, SMB, and FTP protocols are protocols for transferring of files, and it is considered that there is a high possibility that a large capacity of data will be exchanged. On the other hand, DNS, HTTP, and DHCP protocols are defined as protocols of the latter type. This is because, since the DHCP protocol does not exchange large capacity data, it is difficult for a delay to occur, it is common for retry processing to be performed even if there is a failure in the processing once. Conversely, because a protocol timeout is defined for SMTP and POP protocols on a server, these protocols are excluded from the protocols of the latter type.

In step S806 and step S807, the CPU 402 determines, by the power saving mode determination unit 703, what the power saving mode is. For example, in a case where communication by the SMTP protocol is detected in step S804, it can be determined that the definition of the power saving mode is set to be OFF in the example of FIG. 9 by referencing the table 707 in step S805. In such a case, the processing proceeds to step S808, the CPU 402 turns off the power saving mode by the wireless LAN control unit 701, and the processing proceeds to step S811.

Also, in another example, when communication by the SMTP protocol and the HTTP protocol is detected in step S804, it can be determined that the power saving mode is set to OFF for the SMTP protocol, and the power saving mode is set to ON for the HTTP protocol from FIG. 9. Accordingly, in such a case, because one or more protocols for which the power saving mode is defined to be OFF exists in step S806, the processing proceeds to step S808, and the CPU 402 turns off the power saving mode by the wireless LAN control unit 701.

In the MFP 400 according to embodiments, there are cases in which in the middle of image data obtained by reading an original by the reading unit 408 being transmitted by an electronic mail to an external unit, remote UI content (not shown) stored in the ROM 404 is accessed from an external unit.

Furthermore, as another example, when it is assumed that communication of the HTTP protocol is detected in step S804, it can be determined that the power saving mode is set to ON for the HTTP protocol from FIG. 9. In such a case, because no protocol for which the power saving mode is defined to be OFF exists in step S806, the processing proceeds to step S807. In step S807, the CPU 402 determines whether or not a security option is set for the detected communication protocols. Here, the CPU 402, with reference to the option setting 710 corresponding to the protocol, obtains the setting of the security option pertaining to the HTTP protocol. For example, in a case where an SSL option is enabled for the HTTP protocol, the communication can be determined to have a high importance. In such a case, in order to prevent a communication delay, the processing proceeds to step S808 and the CPU 402 turns off the power saving mode. Meanwhile, when the CPU 402, in step S807, determines that the security option is not set, the processing proceeds to step S809, and the CPU 402 sets the power saving mode to ON. Note that SSL in SMTP and POP protocols and SNMP v3 in SNMP protocols can be given as examples of security options other than those described above.

When, step S808 or step S809 is executed and the power saving mode is set to OFF or ON, the processing proceeds to step S811, and the CPU 402 determines whether or not data transmission and reception has been completed by the communication control unit 704. When data transmission and reception has not completed, the processing proceeds to step S804, and the CPU 402 determines whether the protocols detected as being used have changed. Meanwhile, when, in step S811, the CPU 402 determines that data transmission and reception has been completed, the processing proceeds to step S812, the CPU 402 returns the power saving mode to ON by the wireless LAN control unit 701, and the processing completes.

As explained above, by virtue of the present embodiment, the power saving mode in a wireless communication can be determined by referencing protocols detected by the communication control unit 704, the power saving mode setting storage unit 708, and the table 707. With this, the turning OFF/ON of the power saving mode of the wireless LAN terminal can be finely controlled, and both prevention of communication delays, and reduction of the power that the wireless LAN terminal consumes becomes possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-273165, filed Dec. 27, 2013, which is hereby incorporated by reference herein in its entirety.

What is claimed is:

1. An information processing apparatus comprising:
   a wireless communicator that (a) performs a wireless communication with an access point and (b) has a power saving function in which the wireless communicator repeatedly shifts between an awake state, in which the wireless communicator performs the wireless communication with the access point, and a doze state, in which the wireless communicator does not perform the wireless communication with the access point and power consumption of the wireless communicator is suppressed, at regular intervals in accordance with a DTIM interval of DTIMs (Delivery Traffic Indication Messages) transmitted from the access point;

a memory; and a processor that executes instructions stored in the memory to:

(1) set as a setting for the power saving function, in accordance with a user's instruction, one of (a) an ON setting that indicates the power saving function is used and (b) an OFF setting that indicates the power saving function is not used, (2) determine, in a case where the ON setting has been set, whether or not a communication protocol to be used in the wireless communication is a specific communication protocol for transferring a file, and (3) temporarily change the setting for the power saving function from the ON setting to the OFF setting in a case where it is determined that the communication protocol is the specific communication protocol, so that the wireless communicator does not enter the doze state while performing the wireless communication using the specific communication protocol.

2. The information processing apparatus according to claim 1, wherein, in a case where the wireless communication is completed, the wireless communication using the specific communication protocol, the processor returns the setting for the power saving function from the OFF setting to the ON setting.

3. The information processing apparatus according to claim 1, wherein the specific communication protocol is any of NFS, SMB, and FTP.

4. The information processing apparatus according to claim 1, wherein, even in a case where the communication protocol is not the specific communication protocol, the processor changes the setting for the power saving function from the ON setting to the OFF setting under a condition that a security option is enabled for the communication protocol.

5. The information processing apparatus according to claim 4, wherein the security option is an SSL option.

6. The information processing apparatus according to claim 1, wherein the information processing apparatus is a printing apparatus.

7. A control method for controlling an information processing apparatus comprising a wireless communicator that performs a wireless communication with an access point, the wireless communicator having a power saving function in which the wireless communicator repeatedly shifts between an awake state, in which the wireless communicator performs the wireless communication, and a doze state, in which the wireless communicator does not perform the wireless communication with the access point and power consumption of the wireless communicator is suppressed, at regular intervals in accordance with a DTIM interval of DTIMs (Delivery Traffic Indication Messages) transmitted from the access point, the control method comprising:

setting as a setting for the power saving function, in accordance with a user's instruction, one of (a) an ON setting that indicates the power saving function is used and (b) an OFF setting that indicates the power saving function is not used;

determining, in a case where the ON setting has been set, whether or not a communication protocol to be used in the wireless communication is a specific communication protocol for transferring a file; and temporarily changing the setting for the power saving function from the ON setting to the OFF setting in a case where it is determined that the communication protocol is the specific communication protocol, so that the wireless communicator does not enter the doze state while performing the wireless communication using the specific communication protocol.

8. A non-transitory computer-readable storage medium storing a computer program for causing a computer to execute steps of a control method for controlling an information processing apparatus comprising a wireless communicator that performs a wireless communication with an access point, the wireless communicator having a power saving function in which the wireless communicator repeatedly shifts between an awake state, in which the wireless communicator performs the wireless communication with the access point, and a doze state, in which the wireless communicator does not perform the wireless communication with the access point and power consumption of the wireless communicator is suppressed, at regular intervals in accordance with a DTIM interval of DTIMs (Delivery Traffic Indication Messages) transmitted from the access point, the control method comprising:

setting as a setting for the power saving function, in accordance with a user's instruction, one of (a) an ON setting that indicates the power saving function is used and (b) an OFF setting that indicates the power saving function is not used;

determining, in a case where the ON setting has been set, whether or not a communication protocol to be used in the wireless communication is a specific communication protocol for transferring a file; and temporarily changing the setting for the power saving function from the ON setting to the OFF setting in a case where it is determined that the communication protocol is the specific communication protocol, so that the wireless communicator does not enter the doze state while performing the wireless communication using the specific communication protocol.

* * * * *